United States Patent
Smith et al.

(10) Patent No.: US 10,976,636 B2
(45) Date of Patent: Apr. 13, 2021

(54) APPARATUS AND METHOD FOR PROVIDING A SELECTIVELY ABSORBING STRUCTURE

(71) Applicant: Duke University, Durham, NC (US)

(72) Inventors: David R. Smith, Durham, NC (US); Antoine Moreau, Gerzat (FR); Cristian Ciraci, Durham, NC (US); Jack J. Mock, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 15/422,744

(22) Filed: Feb. 2, 2017

(65) Prior Publication Data
US 2017/0357139 A1  Dec. 14, 2017

Related U.S. Application Data

(63) Continuation of application No. 14/394,774, filed as application No. PCT/US2013/036847 on Apr. 16, 2013, now Pat. No. 9,606,414.
(Continued)

(51) Int. Cl.
*G02F 1/01* (2006.01)
*G02F 1/17* (2019.01)
(Continued)

(52) U.S. Cl.
CPC .............. *G02F 1/17* (2013.01); *G02F 1/0102* (2013.01); *G02F 1/0128* (2013.01); *G02F 1/35* (2013.01);
(Continued)

(58) Field of Classification Search
CPC ................. G02F 1/163; G02F 2201/58; E06B 2009/2464; E06B 2009/2476
(Continued)

(56) References Cited

U.S. PATENT DOCUMENTS 4,980,566 A   12/1990  Heilweil
7,679,563 B2   3/2010  Werner et al.
(Continued)

FOREIGN PATENT DOCUMENTS

CN   1957245 A   5/2007
EP   2372348 A1   5/2011
(Continued)

OTHER PUBLICATIONS

Barnes, et al. "Surface plasmon subwavelength optics", Aug. 14, 2003, Nature Publishing Group, vol. 424 pp. 824-830 (Year: 2003).*
(Continued)

*Primary Examiner* — Mahidere S Sahle
(74) *Attorney, Agent, or Firm* — Olive Law Group, PLLC

(57) ABSTRACT

An apparatus is described that selectively absorbs electromagnetic radiation. The apparatus includes a conducting surface, a dielectric layer formed on the conducting surface, and a plurality of conducting particles distributed on the dielectric layer. The dielectric layer can be formed from a material and a thickness selected to yield a specific absorption spectrum. Alternatively, the thickness or dielectric value of the material can change in response to an external stimulus, thereby changing the absorption spectrum.

8 Claims, 2 Drawing Sheets

Related U.S. Application Data

(60) Provisional application No. 61/624,571, filed on Apr. 16, 2012.

(51) Int. Cl.
  *H01Q 17/00* (2006.01)
  *G02F 1/35* (2006.01)
  *B82Y 20/00* (2011.01)

(52) U.S. Cl.
  CPC ......... *H01Q 17/002* (2013.01); *H01Q 17/007* (2013.01); *B82Y 20/00* (2013.01); *G02F 2001/3505* (2013.01); *Y10S 977/834* (2013.01); *Y10S 977/89* (2013.01); *Y10S 977/902* (2013.01)

(58) Field of Classification Search
  USPC .................................................. 359/238–297
  See application file for complete search history.

(56) References Cited

U.S. PATENT DOCUMENTS

| | | | |
|---|---|---|---|
| 2003/0222227 | A1 | 12/2003 | Richards et al. |
| 2005/0100296 | A1 | 5/2005 | Zoorob |
| 2006/0034729 | A1* | 2/2006 | Poponin ............... G01N 21/658 422/82.05 |
| 2006/0072114 | A1* | 4/2006 | Sigalas .................. B82Y 20/00 356/445 |
| 2006/0153261 | A1 | 7/2006 | Krupke |
| 2006/0251368 | A1* | 11/2006 | Kittaka .................. B82Y 20/00 385/125 |
| 2007/0022658 | A1 | 2/2007 | Weder |
| 2007/0171120 | A1 | 7/2007 | Puscasu |
| 2007/0281494 | A1 | 12/2007 | Dimroth |
| 2008/0266640 | A1* | 10/2008 | Wang ..................... B82Y 20/00 359/244 |
| 2009/0034055 | A1 | 2/2009 | Gibson |
| 2009/0326614 | A1 | 12/2009 | El-Sayed et al. |
| 2010/0126567 | A1 | 5/2010 | Kaufman |
| 2010/0171393 | A1 | 7/2010 | Pei et al. |
| 2012/0107958 | A1 | 5/2012 | Poponin |
| 2012/0170097 | A1* | 7/2012 | Han ....................... B82Y 20/00 359/238 |
| 2012/0224255 | A1* | 9/2012 | Bora ..................... B82Y 20/00 359/346 |
| 2014/0185122 | A1 | 7/2014 | Han et al. |

FOREIGN PATENT DOCUMENTS

| | | |
|---|---|---|
| EP | 2372348 A1 | 10/2011 |
| WO | 2010098758 A1 | 9/2010 |
| WO | 2011131586 A3 | 10/2011 |

OTHER PUBLICATIONS

Applicant's response dated Jul. 5, 2016 to Office Action dated Mar. 2, 2016 in U.S. Appl. No. 14/394,774.
Applicant's response dated Nov. 21, 2016 to Office Action dated Sep. 19, 2016 in U.S. Appl. No. 14/394,774.
International Preliminary Report and Written Opinion received in PCT/US2013/036847 dated Oct. 30, 2014.
Moreau, Antonie, et al. "Controlled-Reflectance Surfaces with Film-Coupled Colloidal Nanoantennas," pp. 86-90, Nature, vol. 492, Dec. 6, 2012.
Notice of Allowance dated Dec. 6, 2016 in U.S. Appl. No. 14/394,774.
Office Action (including translation) dated Oct. 10, 2015 in Chinese Patent Application No. 201380020013.9.
Office Action (including translation) dated Jan. 22, 2017 in Chinese Application No. 201380020013.9.
Office Action (including translation) dated May 31, 2016 in Chinese Application No. 20130020013.9.
Office Action dated Mar. 2, 2016 in U.S. Appl. No. 14/394,774.
Office Action dated Sep. 19, 2016 in U.S. Appl. No. 14/394,774.
Supplementary European Search Report dated Nov. 13, 2015 for European Patent Application No. 13777872.6.
Chinese language Office Action issued in counterpart Chinese Application No. 201380020013.9 dated Aug. 10, 2017 with English translation (twenty-four (24) pages).
Communication pursuant to Article 94(3) EPC issued in counterpart EP Application No. 13 777 872.6 dated Apr. 12, 2019 (seven (7) pages).
Communication pursuant to Article 94(3) EPC issued in counterpart EP Application No. 13 777 872.6 dated Dec. 12, 2019 (four (4) pages).

\* cited by examiner

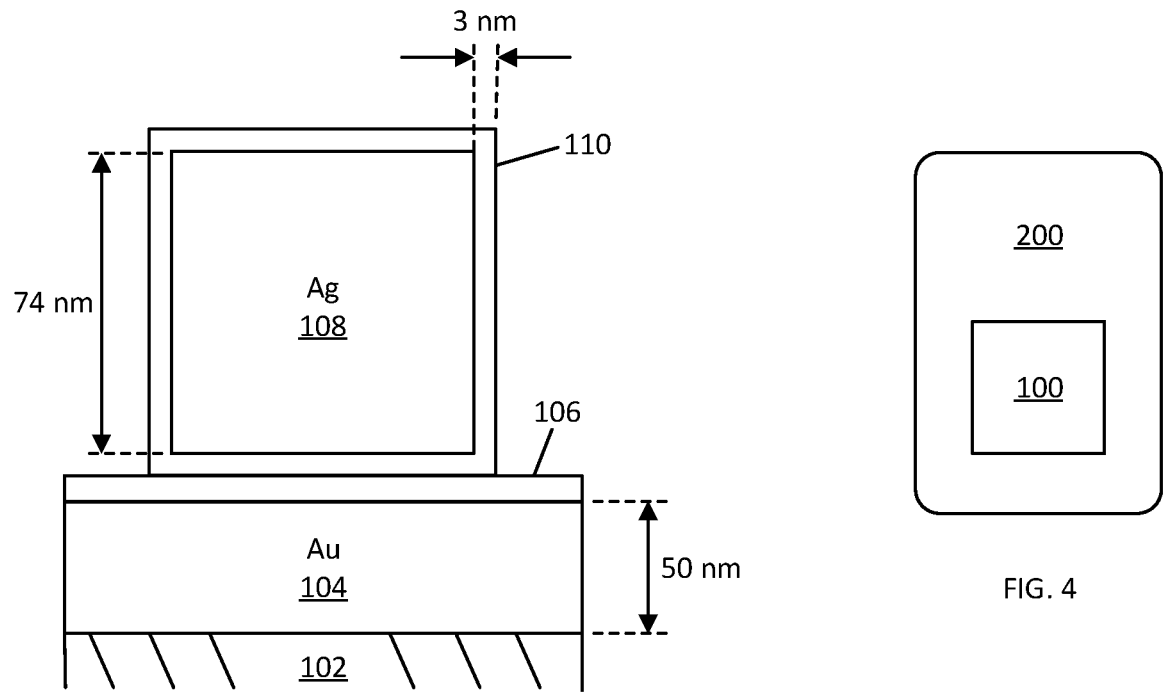
FIG. 2
FIG. 4
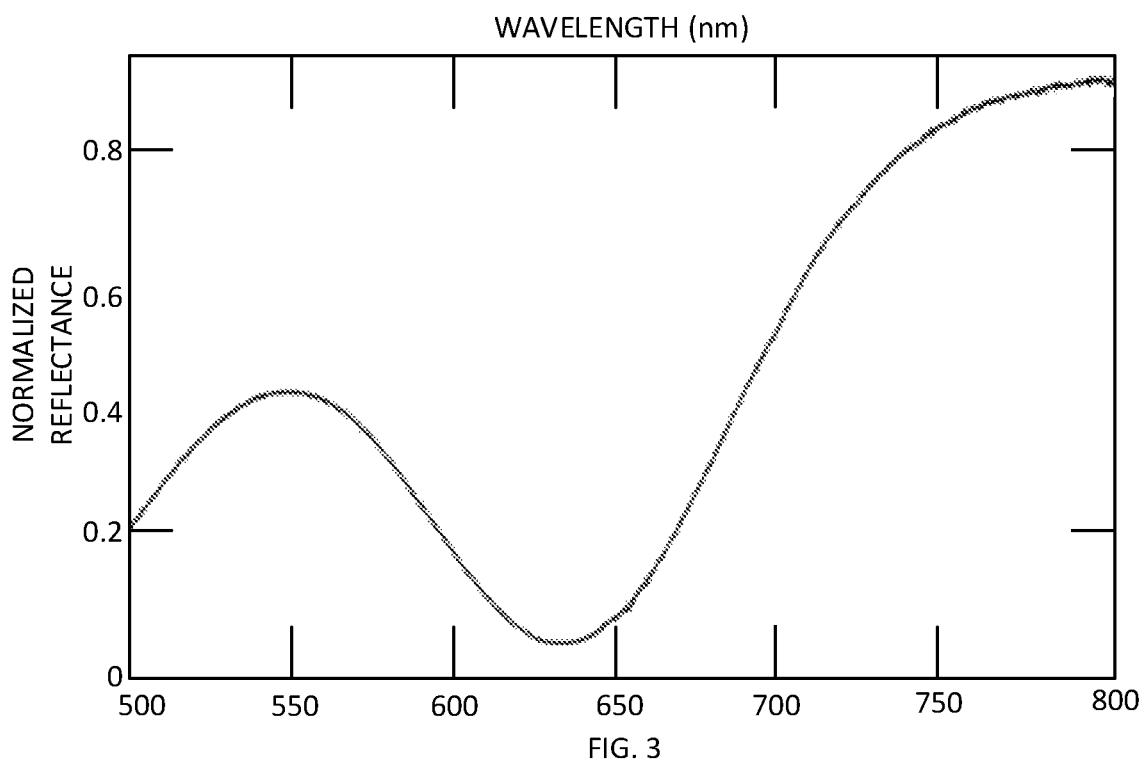
FIG. 3

APPARATUS AND METHOD FOR PROVIDING A SELECTIVELY ABSORBING STRUCTURE

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

The present application is a continuation application of U.S. patent application Ser. No. 14/394,774, filed Oct. 16, 2014 and entitled APPARATUS AND METHOD FOR PROVIDING A SELECTIVELY ABSORBING STRUCTURE, which is a 35 USC 371 application of PCT International Patent Application No. PCT/US13/36847, filed Apr. 16, 2013 and entitled APPARATUS AND METHOD FOR PROVIDING A SELECTIVELY ABSORBING STRUCTURE, which claims benefit of priority of U.S. Provisional Patent Application No. 61/624,571, entitled CONTROLLED REFLECTANCE SURFACES WITH COLLOIDAL PLASMONIC NANOANTENNAS AND METHODS OF USE, naming DAVID R. SMITH, ANTOINE MOREAU, CRISTIAN CIRACI, AND JACK J. MOCK as inventors, filed 16 Apr. 2012; the disclosures of which are incorporated herein by reference in their entireties, and which was filed within the twelve months preceding the filing date of the present application or is an application of which a currently co-pending priority application is entitled to the benefit of the filing date.

RELATED APPLICATIONS

None.

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

STATEMENT OF GOVERNMENT SUPPORT

Research concerning the subject matter disclosed herein was supported, in part, by funds from the United States Government under Air Force Office of Scientific Research (AFOSR) Grant Number FA9550-09-1-0562, entitled ADVANCED METACRYSTAL MEDIA FOR AEROSPACE APPLICATIONS. The U.S. Government has certain rights in the subject matter disclosed herein.

TECHNICAL FIELD

The present subject matter relates to absorption of electromagnetic radiation. More particularly, the present subject matter relates to a selectively absorbing structure.

BACKGROUND

Efficient and tunable absorption of electromagnetic radiation is useful for a variety of applications, such as designing controlled-emissivity surfaces for thermo-photovoltaic devices, tailoring an infrared spectrum for controlled thermal dissipation, and producing detector elements for imaging.

SUMMARY

An apparatus is provided for selectively absorbing electromagnetic radiation. In one aspect, the apparatus includes a conducting surface, a dielectric layer formed on the conducting surface, and a plurality of conducting particles distributed on the dielectric layer. The conducting particles may be cube-shaped and may be distributed randomly by colloidal absorbance on the dielectric layer. The dielectric layer may include material whose thickness or dielectric value changes in response to an external stimulus, such as an applied electric field, applied electromagnetic radiation, presence of a chemical substance, or presence of a molecular analyte. The dielectric layer may include nonlinear media or gain media. In another aspect, a method of forming such an apparatus may include selecting a design electromagnetic wavelength for selective absorption. A conducting surface is formed, and a dielectric layer is formed thereon. The dielectric layer has a thickness corresponding to a spacing parameter associated with the design wavelength. Multiple conducting particles, such as metal cubes or rods, are distributed on the dielectric layer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIG. 2 is a schematic showing example dimensions of a selectively absorbing structure;

FIG. 3 is a graphical depiction of a spectral response of a selectively absorbing structure; and FIG. 4 is a schematic depiction of an electronic and optical system including a selectively absorbing structure.

DETAILED DESCRIPTION

Figure 1:
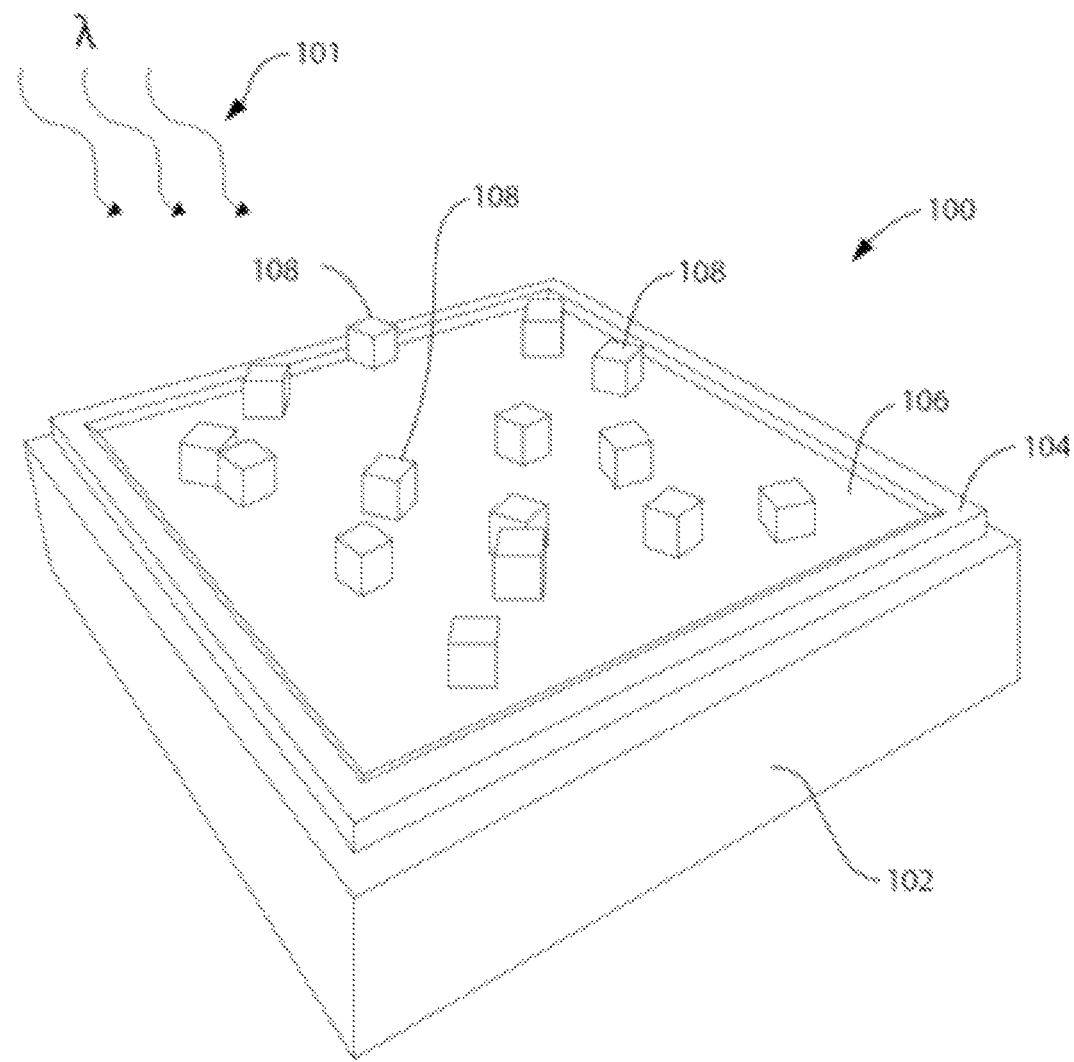
FIG. 1 is a schematic depiction of a selectively absorbing structure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 depicts a selectively absorbing structure 100 that selectively absorbs certain wavelengths of electromagnetic radiation 101, such as light. The structure 100 is formed from a substrate 102, a conducting surface 104, a dielectric spacer layer 106, and a plurality of conducting particles 108. In one embodiment, the conducting surface 104 is a metal film, such as gold, that is deposited on the substrate 102. The dielectric layer 106 may be fabricated from any of a wide variety of suitable materials, such as polyelectrolyte materials, and can have an index of refraction greater than 1.5, although indices of refraction less than 1.5 are also acceptable. In certain embodiments, the dielectric layer 106 may be formed by optically nonlinear media. Examples of such media include second-harmonic generation materials, such as barium borate, lithium iodate, potassium niobate, gallium selenide, along with other well-known nonlinear optic materials, including organic nonlinear optical materials. In other embodiments, the dielectric layer 106 may be a gain medium or active lasing medium. Examples of such media include gallium arsendide, gallium nitride, crystals (e.g., sapphire or yttrium orthovanadate) or glasses (e.g., silicate or phosphate glasses) doped with rare-earth ions or transition metal ions, along with other well-known gain media, including liquid and gas lasing media.

The conducting particles 108 may be cube-shaped (as shown in FIG. 1), rod shaped, or otherwise preferably shaped to provide a planar surface that is disposed parallel to the conducting surface 104, in order to support a gap-plasmon guided mode between the particle and conducting surface. Those skilled in the art will appreciate that the selective-absorption properties of structure 100 is due to plasmon resonance. Plasmon resonance is associated with certain metals at infrared, visible, and ultraviolet wavelengths. As is understood, other non-metallic materials support plasmon-like responses at other wavelengths. Accordingly, the term "conductor" and "conducting" is used herein in its general meaning to encompass any specific material that can support a plasmon response associated with a specified wavelength.

FIG. 2 depicts example dimensions of the constituent parts of the selectively absorbing structure 100. In one embodiment, the conducting surface 104 can be gold film of approximate 50 nm thickness. The conducting particle 108 can be a silver nanocube with approximate edge length of 74 nm, and with a 3-nm thick stabilizer coating 110. The reflectance characteristics of structure 100 are determined by the separation distance between the silver nanocubes 108 and gold film 104, by the dielectric properties of materials used to form the dielectric spacer 106 and stabilizer 110, by the uniformity of nanocube size, and by the percentage of gold film that is covered by the silver nanocubes.

The reflectance of structure 100 is particular sensitive to cube-film spacing, thereby providing a tunable and selectively absorbing structure by varying the thickness of the spacer layer 106. Experimental measurements have been taken using the structure 100 with the general geometries depicted in FIG. 2, and with different thicknesses of a polyelectrolyte having index of refraction 1.54. A 6 nm spacer layer 106 yielded a reflectance minimum of less than 7% for normally incident 637 nm light with samples having 17.1% surface coverage (see FIG. 3). Thinner spacer layers experimentally yielded reflectance minima for incident electromagnetic radiation having a wavelength between 700 and 800 nm, and greater than 800 nm. Thicker spacer layers provide reflectance minima for light having wavelengths less than 600 nm.

Those skilled in the art will appreciate that a designer can choose different thicknesses for spacer layer 104, and thereby can select different corresponding design wavelengths for selective absorption by structure 100. Conversely, any changes to the conformation of the spacer layer 104 (such as changes in dielectric value or changes in thickness) will result in a different absorption spectra produced by the structure 100. Accordingly, the structure 100 can be employed as a sensor. For example, the dielectric layer 104 can be composed of inorganic or organic material that changes conformation in response to an external stimulus. The corresponding change in the selectively absorbed wavelength detects the presence of that external stimulus, such as an applied electric field, electromagnetic radiation, or the presence of a chemical substance or molecular analyte.

FIG. 4 depicts the selectively absorbing structure 100 as included within an electronic and optical system 200. Those skilled in the art will appreciate that the spectral control and response provided by an absorbing surface structure can form the basis for a number of promising applications, including electronic and optical systems such as thermophotovoltaic devices, infrared spectrometric devices, thermal detectors, imaging devices, light sources, and sensors.

In an example scenario, nanocubes in accordance with the present subject matter may be configured for use in biosensors and as an entirely colloidal absorber. Alternative applications include, but are not limited to, plasmonic patch nanoantennas for biological sensing. In an example, the mode supported by a gap under the cubes may be reflected back and forth by the edges of the cube, so that this gap can be considered as an interferometer. Any change to the velocity of the mode (by changing even slightly the spacing between the cubes and the film by whatever mean) or any change in the reflection coefficient of the mode that may be brought by a change in the surrounding medium may produce a shift in the resonance of the cavity that can easily be detected—either by surface reflectance or through the resonant scattering by an individual cube. A gap waveguide mode may be positioned between the cube and the film that is altered by molecular binding events at the edges of the cube. Alternatively, the cube may sit on a bed of molecules (such as DNA, proteins, etc.) or an inorganic layer whose conformation is sensitive and external stimuli triggering a change in the gap dimension and thus a modification of the waveguide mode.

In addition to the use of a film to create controlled reflectance surfaces, instead one can make use of engineered nanoparticles in a non-conducting, transparent host. In this case, magnetic-like scattering nanoparticles, which may be two metallic disks or patches separated by an insulating layer, may be combined with regular metallic nanoparticles that provide electric scattering. By tuning the properties of the nanoparticles and their relative densities, the electric and magnetic responses can be controlled in the same manner as the film-coupled patches. The result is a controlled reflectance surface that can be created without the use of a metallic film, which may be advantageous for certain applications.

It is noted that the application of metals in photonic systems can be hampered by the relatively large absorption that results when resistive currents are excited. However, classes of applications exist in which, rather than being a hindrance, absorption may be advantageous, or perhaps even a requisite property. Such applications include the design of controlled emissivity surfaces for increasing thermophotovoltaic efficiency; tailoring of the infrared spectrum for controlled thermal dissipation; tailoring of the infrared spectrum for signature control; and detector elements for imaging.

Numerous metamaterial- and plasmonic-based "perfect absorbers" include metallic surfaces that are patterned with micro- or nano-scale structures that act as magnetic resonators. By tuning and optimizing the magnetic resonances, the electric currents of a metallic sheet can be balanced with effective magnetic currents, and the composite structure no longer reflects at the targeted wavelength. Note that the term "perfect absorber" is primarily descriptive, and refers to surfaces that can be engineered so as to minimize reflectance over a specified band of frequencies. These surfaces may also be referred to as "ideal absorbers," since they make sue of match electric and magnetic response. The minimum reflectance can be quite good, with up to 99.5% of light absorbed at a specific design wavelength and for a specific angle of incidence. By implementing combinations of structures on a film, the spectral characteristics of a surface can be controlled with great flexibility.

Many ideal absorber structures involve the use of lithographic patterning, which does not feasibly scale well to large areas, as may be needed for certain applications. Colloidally-prepared nanocubes in accordance with embodiments of the present disclosure can be spaced closely to a metal film, as a way of forming a perfect absorbing surface. Colloidal preparation can be inexpensive, and offers an alternative route for creating surfaces with controlled reflectance or emissivity properties. The underlying mechanism of the nanocubes may be that of a patch antenna, so that any nanoparticle that is reasonably flat, such as a pancake, disk, or the like, can be used to control reflectance. Since the underlying effect does not rely on periodicity, a random coverage of nanoparticles, brought to sufficient densities that can be easily calculated in accordance with the present disclosure, can serve to produce perfect absorbing surfaces.

In accordance with embodiments of the present disclosure, the geometry may be that of a thin metallic film (e.g., made of gold) covered by an insulating dielectric with controlled thickness, on which are deposited metallic nanoparticles with the necessary geometry and density. Silver or gold are examples of metals that can be used for the nanoparticles. Because the underlying mechanism of the absorber effect relates to modes that are excited within the gap between the metallic nanoparticle and film, a wide variety of materials can be used (e.g., platinum, titanium, aluminum, copper, and the like), with the controlled reflectance properties turned to nearly any wavelength region in the visible, infrared, and terahertz ranges.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. An apparatus, comprising:
a substrate;
a conducting layer attached to the substrate and defining a substantially parallel surface;
a plurality of nanostructures each having a substantially parallel surface that faces the parallel surface of the conducting layer; and
a spacer including a dielectric material and disposed between the parallel surfaces of the conducting layer and the parallel surfaces of the nanostructures, wherein the spacer forms gaps of predetermined distances between the parallel surfaces of the conducting layer and the parallel surfaces of the nanostructures to form a respective plurality of parallel-plate gaps adjacent to the nanostructures, wherein each parallel-plate gap supports a gap waveguide mode that is an interferometric cavity resonance corresponding to a build-up of a stationary wave localized within the parallel-plate gap, wherein the dielectric material has a dielectric value that changes in response to an external stimulus selected from one of an applied electric field, electromagnetic radiation, a chemical substance, and a molecular analyte.

2. The apparatus of claim 1, wherein each of the parallel surfaces of the nanostructures forms a first boundary of the respective parallel-plate gap.

3. The apparatus of claim 2, wherein the parallel surface of the conducting layer forms a second boundary of the parallel-plate gaps.

4. The apparatus of claim 1, wherein each of the nanostructures is a metallic nanostructure.

5. The apparatus of claim 4, wherein each of the metallic nanostructures includes silver or gold.

6. The apparatus of claim 4, wherein each of the metallic nanostructures includes copper.

7. The apparatus of claim 1, further comprising stabilizer coatings disposed on the nanostructures, wherein at least a portion of the spacer comprises a portion of each of the stabilizer coatings, and wherein the stabilizer coatings have predetermined thicknesses to be at least a part of the respective predetermined distances between the parallel surfaces of the conducting layer and the parallel surfaces of the nanostructures.

8. The apparatus of claim 7, wherein the predetermined distances of the gaps consists of the distances of the predetermined thicknesses of the stabilizer coatings and the thickness of the dielectric material for forming desired thicknesses of the parallel-plate gaps.

* * * * *